(No Model.)
D. McCARTHY.
CAR AXLE LUBRICATOR.
No. 521,807. Patented June 26, 1894.
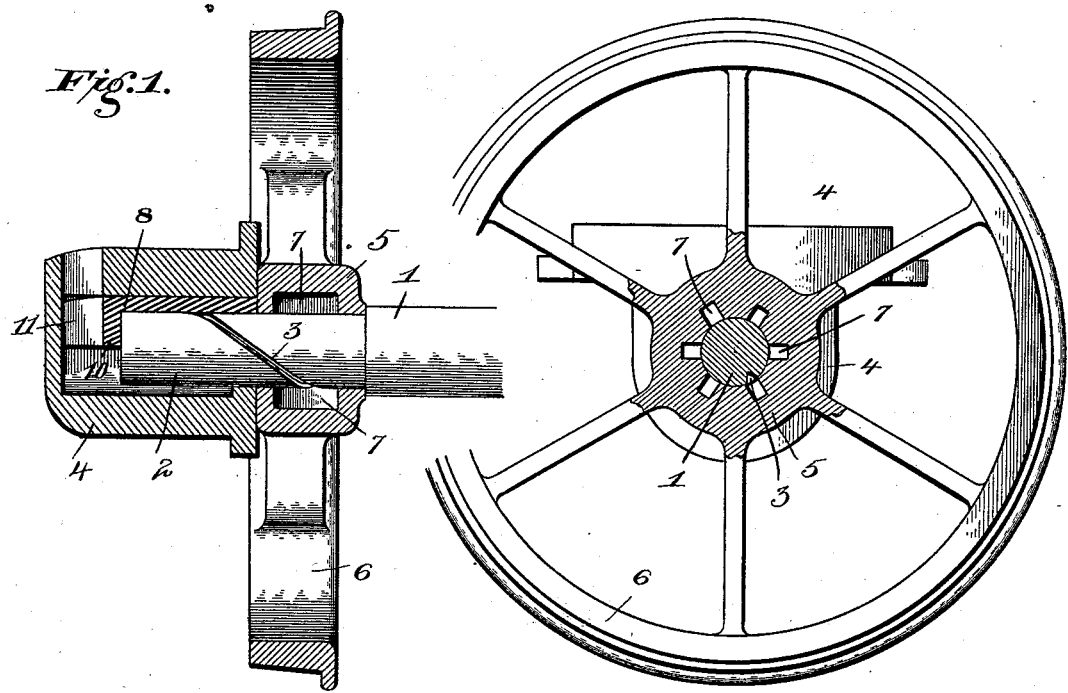
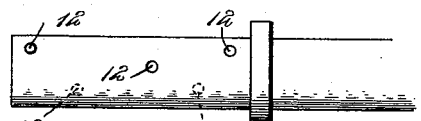
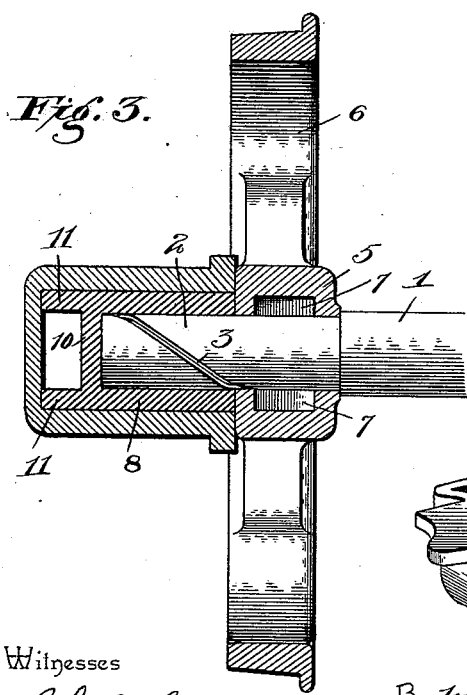
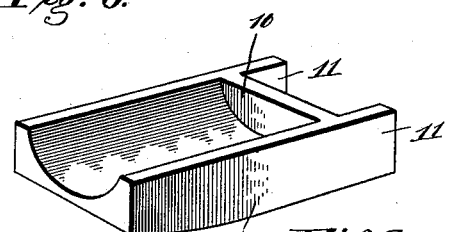
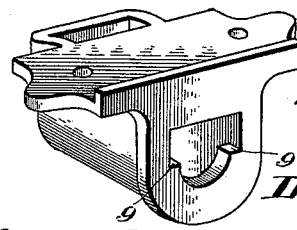
Witnesses
John C. Shaw
N. J. Riley
Inventor
Dennis McCarthy.
By his Attorneys,
C. A. Snow & Co.

UNITED STATES PATENT OFFICE.

DENNIS McCARTHY, OF MINER'S MILLS, PENNSYLVANIA.

CAR-AXLE LUBRICATOR.

SPECIFICATION forming part of Letters Patent No. 521,807, dated June 26, 1894.

Application filed January 31, 1894. Serial No. 498,651. (No model.)

*To all whom it may concern:*

Be it known that I, DENNIS MCCARTHY, a citizen of the United States, residing at Miner's Mills, in the county of Luzerne and State of Pennsylvania, have invented a new and useful Car-Axle Lubricator, of which the following is a specification.

The invention relates to improvements in axle lubricators.

The object of the present invention is to improve the construction of axle lubricators, and to provide simple and inexpensive means for distributing a lubricant over the spindle of an axle, and for maintaining the journal bearing in proper position.

The invention consists in the construction and novel combination and arrangement of parts, hereinafter fully described, illustrated in the accompanying drawings and pointed out in the claims hereto appended.

In the drawings—Figure 1 is a vertical sectional view of a wheel and journal box of an axle lubricator constructed in accordance with this invention, the axle being shown in elevation. Fig. 2 is a vertical sectional view taken longitudinally of the wheel. Fig. 3 is a horizontal sectional view. Fig. 4 is a detail perspective view of the journal bearing. Fig. 5 is a detail perspective view of the journal box. Fig. 6 is a detail view showing a modification of the journal.

Like numerals of reference indicate corresponding parts in all the figures of the drawings.

1 designates an axle, provided in its journal 2 with a spiral groove 3 adapted to convey oil or another lubricant from a journal box 4 to the hub 5 of a wheel 6. The hub 5 of the wheel is provided at its interior with oil pockets or recesses 7, arranged at intervals, and adapted to collect and store oil for lubricating the journal 2, and are open throughout their entire length to expose the journal 2 fully to the action of a lubricant. The wheel rotates on the journal of the axle, whereby the lubricant is well distributed and friction reduced to a minimum. The journal of the axle, which is designed for cars, after passing through the wheel projects outward beyond the same and fits within the journal box, and has resting upon it a journal bearing plate 8 arranged in the upper portion of the journal box, which is provided with shoulders 9. The lower face of the journal bearing plate is concaved, and it is provided at the outer extremity of the concaved portion with a segmental flange 10. The outer end of the journal bearing plate is provided with oppositely disposed projections 11, which fit against the outer wall of the journal box to maintain the journal bearing plate in proper position at all times, and to prevent any liability of its becoming accidentally misplaced. The projections 11 are arranged adjacent to the side walls of the journal box, and the space between them corresponds with the oil hole or filling opening of the journal box, and the projections do not in any manner interfere with the supplyment or distribution of the lubricant. The upper portion of the journal box is shaped in the usual manner, and is designed to be secured to or connected with the frame of a bar.

The spiral groove of the axle forms a continuous oil pocket for the distribution of oil; but, as illustrated in Fig. 6 of the accompanying drawings the spindle may be provided with a series of separate indentations or pockets 12 for the reception of the lubricant.

It will be seen that the axle lubricant is simple and comparatively inexpensive in construction, that it is positive and reliable in operation, and that the journal bearing is securely retained in its position.

Changes in the form, proportion and the minor details of construction may be resorted to without departing from the principle or sacrificing any of the advantages of this invention.

What I claim is—

1. The combination, with a journal box, of a wheel provided in the wall of its spindle opening with an annular series of oil recesses extending longitudinally of the hub and communicating with the spindle opening throughout their entire length, and a journal having an oil pocket and arranged in the opening of the hub of the wheel and extending beyond the latter into the journal box, substantially as described.

2. A journal box provided with a bearing plate having at its outer extremity a pair of oppositely disposed projections fitting against the outer wall of the journal box to retain the bearing plate in proper position, and having the space between them registering with the oil hole or opening, said bearing plate being provided at the inner terminals of the projections with a segmental flange to abut against the outer end of a journal substantially as described.

In testimony that I claim the foregoing as my own I have hereto affixed my signature in the presence of two witnesses.

DENNIS McCARTHY.

Witnesses:
M. D. MOOT,
M. H. McANIFF.